United States Patent

Blond

[11] Patent Number: 6,068,042
[45] Date of Patent: May 30, 2000

[54] TO FLEXIBLE WALLS, IN PARTICULAR FOR VEHICLE BODYWORK

[75] Inventor: Jean Blond, Nort sur Erdre, France

[73] Assignee: Fair International, La Chapelle sur Erdre, France

[21] Appl. No.: 09/101,756

[22] PCT Filed: Jan. 17, 1997

[86] PCT No.: PCT/FR97/00094

§ 371 Date: Oct. 19, 1998

§ 102(e) Date: Oct. 19, 1998

[87] PCT Pub. No.: WO97/26146

PCT Pub. Date: Jul. 24, 1997

[30] Foreign Application Priority Data

Jan. 19, 1996 [FR] France ................................... 96 00771

[51] Int. Cl.[7] .................................................. A47H 23/10
[52] U.S. Cl. .......................................... 160/330; 160/329
[58] Field of Search .................................... 160/327, 328, 160/329, 330, 332, DIG. 7, 368.1, 354, 349.1, 349.2

[56] References Cited

U.S. PATENT DOCUMENTS

| 2,281,635 | 5/1942 | Strauss | 160/DIG. 7 X |
|---|---|---|---|
| 2,886,481 | 5/1959 | Swan | 160/328 X |
| 5,351,739 | 10/1994 | Levy | 160/330 X |
| 5,503,211 | 4/1996 | Engi | 160/DIG. 7 X |
| 5,680,893 | 10/1997 | Neer | 160/330 |
| 5,758,704 | 6/1998 | Elrod | 160/327 X |

FOREIGN PATENT DOCUMENTS

| 0292098 | 11/1988 | European Pat. Off. . |
|---|---|---|
| 03311242 | 4/1989 | European Pat. Off. . |
| 0424276 | 4/1991 | European Pat. Off. . |
| 261851 | 1/1986 | United Kingdom . |
| 2174136 | 10/1986 | United Kingdom . |
| WO89/00934 | 2/1989 | WIPO . |

*Primary Examiner*—David M. Purol
*Attorney, Agent, or Firm*—Greenblum & Bernstein, P.L.C.

[57] ABSTRACT

A flexible reinforced wall includes a plastified canvas and a trellis for reinforcing the plastified canvas. The trellis includes a plurality of ribbons with at least some of the plurality being arranged perpendicular to one another and wherein at least some of ribbons comprising a plastic material which is fixable to the plastified canvas. The ribbons have a continuous metal core for increasing their strength. The trellis is fixed to the plastified canvas by one of glueing or welding.

21 Claims, 2 Drawing Sheets

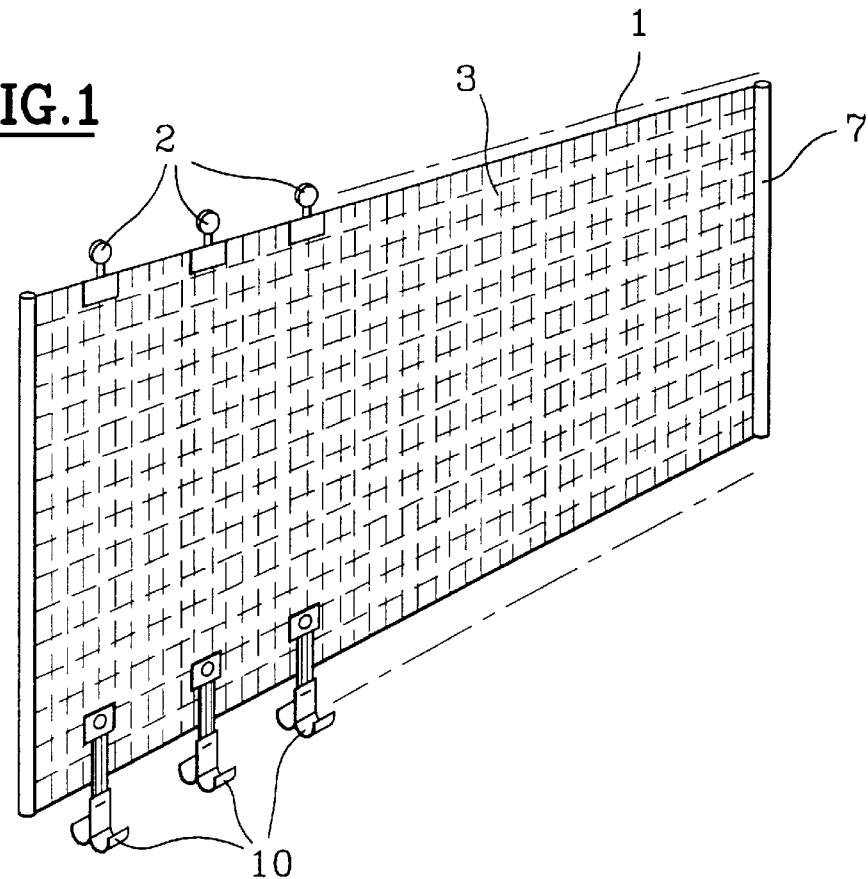
FIG.1
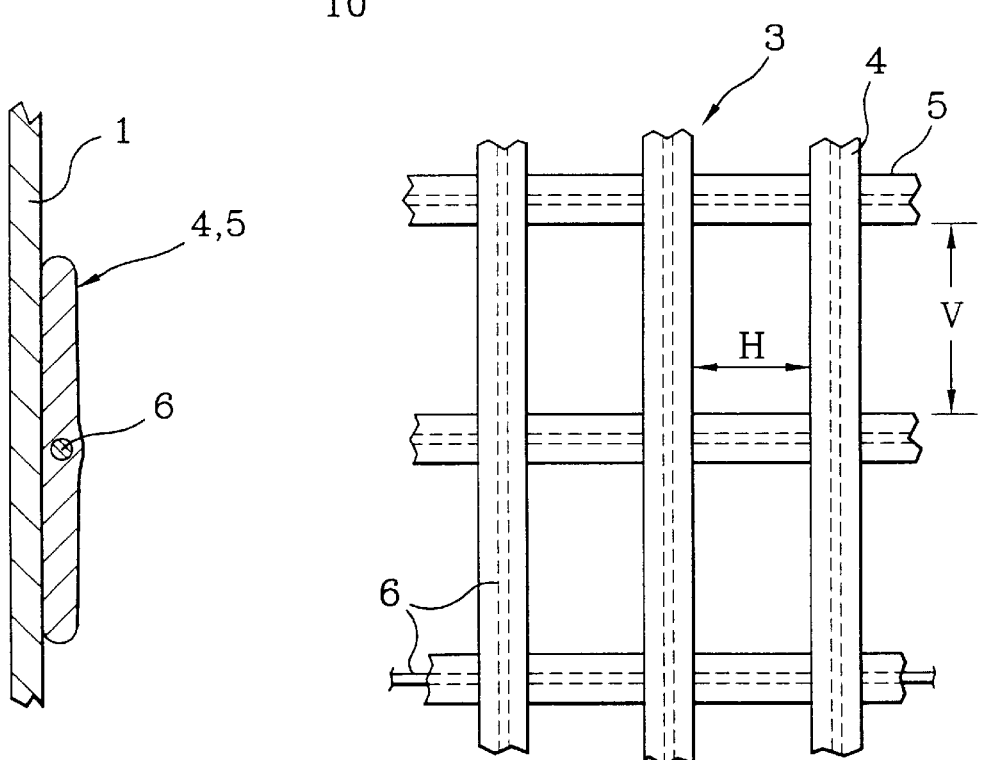
FIG.3
FIG.2

TO FLEXIBLE WALLS, IN PARTICULAR FOR VEHICLE BODYWORK

BACKGROUND OF THE INVENTION

1. Field of the Invention

This invention concerns an improvement to flexible walls of plastic canvas, which is fitted in particular to the bodies of vehicles, but which can also be utilized in temporary or other buildings.

These flexible walls or curtains are typically suspended from the top rails of the vehicle body, stretched at their lateral extremities in an appropriate manner, with their lower edge being fixed by straps to the edges of the vehicle floor.

2. Description of Background and Relevant Information

As in the case of the wall described in document GB-A-2 161 851, the invention can be used to improve the security of the transported goods, the latter being protected against harmful acts, vandalism and/or theft. In the case of the above-mentioned document, this protection results from what is a veritable double wall:

- the conventional wall or curtain,
- a lining in the form of reinforced canvas, the edges of which are fixed to the conventional wall.

SUMMARY OF THE INVENTION

This invention proposes an improvement which, in addition to the protection which it affords, also improves the appearance of this type of curtain.

On one of its faces, preferably the inside face, the flexible wall according to the invention utilizes a trellis formed of ribbons which are glued or welded vertically and horizontally. These ribbons are made from material which is compatible with that of the curtain, of the PVC type, and have a continuous central core made of a material such as steel, which is highly resistant to shear and extension.

According to a variant of the invention, the trellis can also be pre-assembled, and there after fixed to the curtain by a heat-welded film.

According to the invention, the mesh of the trellis is approximately 10 cm wide and 10 to 20 cm high for example, so that a good degree of flexibility is retained by the curtain.

Again according to the invention, the material making up the central core of the PVC ribbons are in the form of a smooth or rough wire or micro-cable, or may be in the form of a tape.

When used on the bodies of vehicles, the flexible wall comes in the form of a curtain which slides at the top, running along the body of the vehicle. Such a curtain includes sliding devices attached to its upper parts, attachment devices at the sides for exerting a high degree of longitudinal tension to the curtain, and attachment devices placed at regular intervals at the bottom of the curtain, so as to stretch the curtain vertically as well as to secure it to the edge of the floor. These attachment devices utilize elastic straps interposed between an anchoring bracket attached to the bottom of the curtain and a hook fitting onto the edge of the floor.

According to another arrangement of the invention, the top bracket of the attachment devices includes a securing elements for securing it to the curtain, and these elements may be bolts which clamp the bracket to the curtain using a strengthening plate which is glued and/or welded to the inner face of the flexible wall.

Again according to the invention, the strengthening plate for anchoring the upper bracket of each attachment device to the flexible wall is preferably made of a metal plate with a PVC covering.

According to another arrangement of the invention, the attachment device has two identical parts at its bottom end, and these are fixed back to back to form on one side a hook which attaches to the edge of the floor, and on the other side a handle for manipulating the attachment device.

According to an alternative variant, the lower part of the attachment device includes a hook, and underneath this hook there is an operating handle.

Still again according to the invention, the hook includes a ring or tube which allows the passage of a locking device for sealing purposes.

BRIEF DESCRIPTION OF THE DRAWINGS

However the invention will be detailed still further by the following description and the attached diagrams provided here as a guide only, and in which:

FIG. 1 represents, in a schematic manner, the external face of a flexible wall comprising the body curtain of a vehicle;

FIG. 2 represents a portion of the trellis, fixed or welded to the internal wall of the curtain show in FIG. 1;

FIG. 3 shows an enlarged section of the tape making up the trellis applied against the curtain;

DETAILED DESCRIPTION OF THE INVENTION

Figure 4:
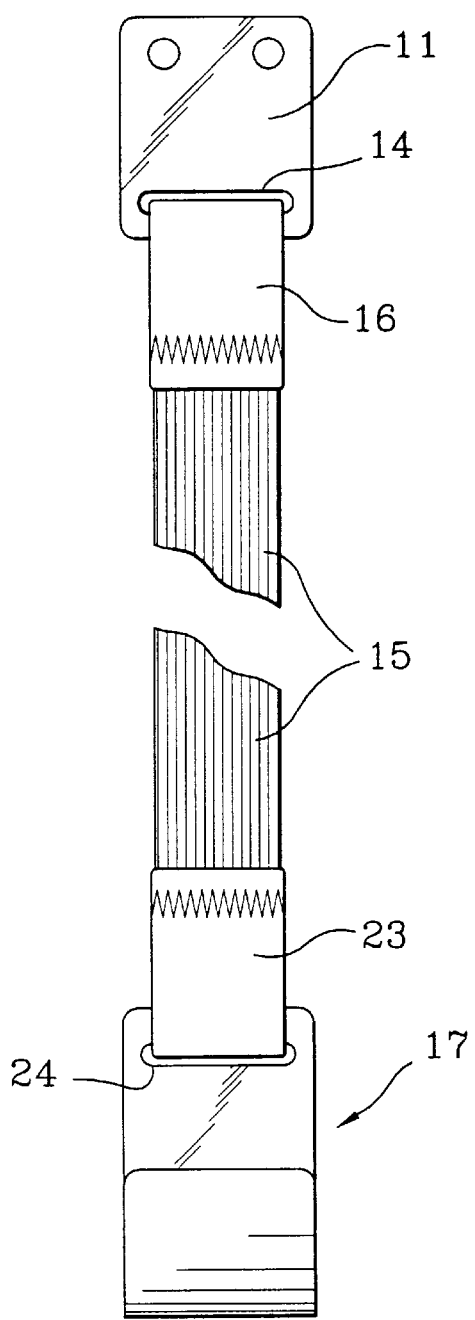
FIG. 4 represents an attachment device suitable for placing on the bottom part of the curtain, viewed from the front.

The curtain, represented in FIG. 1, is composed of a canvas 1 suspended by a large number of runners 2 to the structure of the body of a vehicle which is not shown.

The canvas of which this curtain is composed is made from a plastic-impregnated textile tissue.

In order to improve its ability to accept traction in both longitudinal and vertical directions, this canvas is covered, preferably on the inside, with a trellis 3 having a large number of vertical 4 and horizontal 5 ribbons. This trellis can be made up, and glued or welded directly onto the canvas, or can be pre-assembled and then fixed onto the said canvas, directly and/or by an additional plastic film not shown, which can be heat-welded for example.

As shown in FIG. 3, these ribbons 4 and 5 are very thin and have a width of the order of few millimetres, 5 to 10 for example, and are made from a material, such as PVC, which is compatible with that of the curtain, and which can be welded or glued to the curtain as appropriate.

These ribbons include a continuous central core 6 in a material such as steel, for example, which is resistant to extension and to shear.

This core 6 is composed of a steel wire or a microcable, or a metal braid or even of a tape. The ribbons 4 and 5 serve as the attachment interface between the core 6 and the canvas of the curtain 1.

The trellis 3 forms a sort of reinforcing on the internal face of the curtain, and improves the ability to tension the curtain both horizontally and vertically.

The horizontal ribbons are preferably spaced at a distance V of the order of 10 to 20 cm, while the vertical ribbons are spaced at a distance H of the order of 10 cm for example, forming a square or rectangular mesh.

The trellis 3 also comprises protection against aggression, such as serious cutting of the canvas. This protection can prevent serious damage to or theft of the merchandise carried.

This trellis 3 is also associated with the various devices which provide the connection between the curtain and the structure of the vehicle body.

The horizontal longitudinal tension on the curtain is provided by poles 7 which are attached at each vertical end. These poles are welded or glued to the canvas, and are attached to the structure of the body which is not shown.

Figure 5:
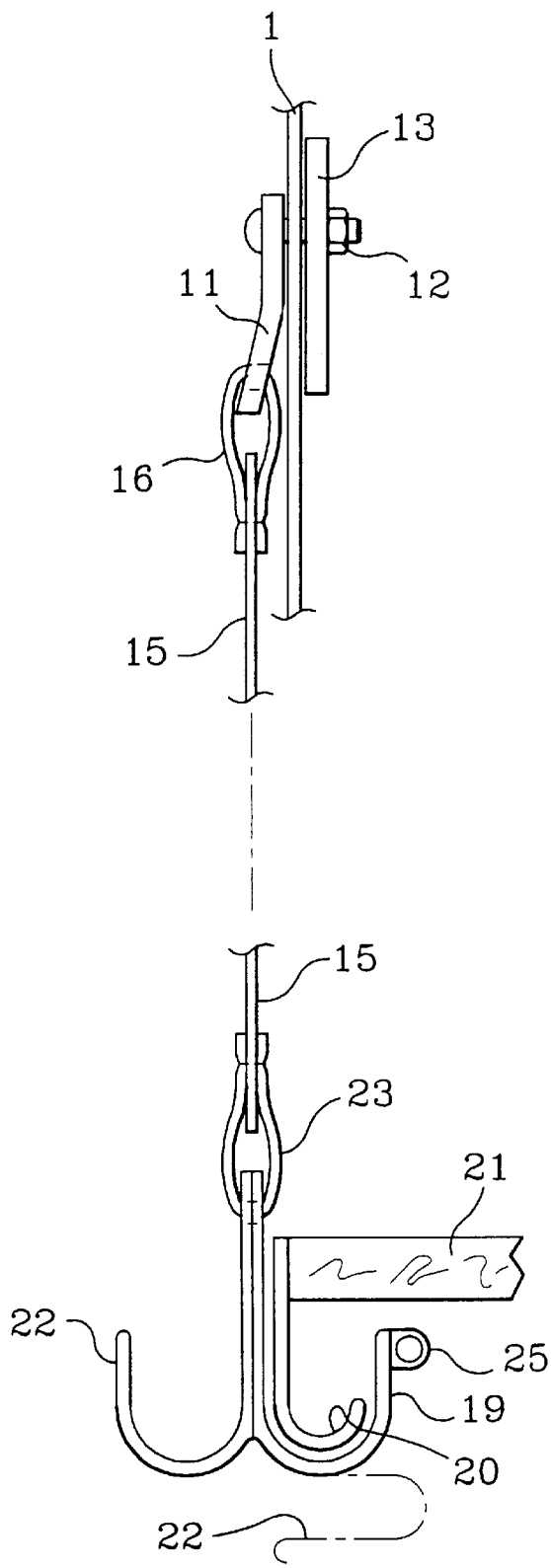
FIG. 5 is a side view of an attachment device, fixed to the curtain and in the normal attachment position, fixed to the edge of the vehicle floor.

The vertical tension on the curtain is achieved by the attachment devices 10 distributed regularly along the bottom of the curtain. FIG. 4 represents a front view of one of the attachment devices 10. This attachment device is composed of an anchoring bracket 11 in a light metal for example. This anchoring bracket is fixed, as shown in FIG. 5, by a pair of bolts 12 for example.

This fixing is applied directly to the curtain 1, at the bottom, the curtain being clamped between the bracket 11 and a plate 13 placed on the inside of the curtain. This plate 13 is preferably composed of a PVC covered metal plate, and it is either welded or glued to the inside of the curtain.

The bracket 11 has a slot 14 at the bottom which is used for anchoring an elastic strap 15 by a piece of ordinary woven strap 16, to which it is sewn, for example.

The flexible strap comes in the form of a tape with a width of the order of a few centimetres. In order to achieve strength, it is preferable be to utilize a double-width strap, the strength of which would be similar to that of an ordinary woven strap.

Rubber cables, of the type used in extenders, can also be used.

The attachment device 10 has a part 17 at the bottom composed of two identical parts assembled back to back, forming on one side a hook 19 which fits onto the edge 20 of the floor 21 of the vehicle body. At the back of the hook 19 there is a similar part which forms a handle 22 used to operate the attachment device, and in particular to exert tension on the elastic strap 15.

The elastic strap 15 is fixed, like its upper part, by a piece of woven strap 23 which passes through a slot 24 cut into part 17.

The handle 22 can also be located below the hook 19, as shown by a fine broken line, in a manner which reduces the external dimensions.

The hook 19 can also have a ring or a tube 25 to receive the locking and seal-fitting cable.

What is claimed is:

1. A flexible reinforced wall, comprising:
   a plastified canvas; and
   a trellis for reinforcing the plastified canvas comprising a plurality of ribbons, with at least some of the ribbons being arranged substantially perpendicularly to one another;
   at least some of ribbons comprising a plastic material which is fixable to the plastified canvas and a continuous metal core for increasing the strength of the ribbons;
   wherein the trellis is fixed to the plastified canvas by one of glueing or welding.

2. The flexible reinforced wall of claim 1, wherein the plastic material comprises PVC and wherein the metal core comprises steel.

3. The flexible reinforced wall of claim 1, wherein the trellis comprises a subassembly of substantially perpendicularly arranged ribbons, said ribbons being fixed to one another.

4. The flexible reinforced wall of claim 3, further comprising a heat-weldable film disposed between the trellis and the plastified canvas.

5. The flexible reinforced wall of claim 1, further comprising a first plurality of ribbons arranged parallel to another and a second plurality of ribbons arranged substantially perpendicular to the first plurality of ribbons,
   wherein the first plurality of ribbons is spaced apart by a distance of approximately 10 cm and wherein the second plurality of ribbons is spaced apart by a distance in the range of approximately 10 to 20 cm.

6. The flexible reinforced wall of claim 1, wherein each ribbon comprises a centrally disposed metal core, said metal core comprising one of a wire, a micro-cable, metal braid, and a tape.

7. The flexible reinforced wall of claim 6, wherein the metal core comprises an exterior surface which is smooth.

8. The flexible reinforced wall of claim 6, wherein the metal core comprises an exterior surface which is rough.

9. The flexible reinforced wall of claim 1, wherein the reinforced flexible wall further comprises a polygon shape with at least four sides;
   wherein a first side comprises a plurality of sliding devices, a second opposite side comprises a plurality of flexible attachment devices being regularly spaced, and third and fourth sides each comprising a longitudinal attachment device.

10. The flexible reinforced wall of claim 9, wherein each of the sliding devices, the flexible attachment devices, and the longitudinal attachment devices are fixable to a vehicle.

11. The flexible reinforced wall of claim 10, wherein each of the flexible attachment devices further comprise an elastic strap, said elastic strap including an anchoring bracket disposed on one end and a hook part on another end;
    wherein the anchoring bracket fixes the elastic strap to the second side and the hook part is engageable with a floor edge of the vehicle.

12. The flexible reinforced wall of claim 11, wherein the strap is fixed to the second side using at least one bolt which extends between the anchoring bracket and a strengthening plate which is fixed to an opposite surface of the second side;
    wherein the second side is disposed between the anchoring bracket and the strengthening plate.

13. The flexible reinforced wall of claim 12, wherein the strengthening plate comprises a metal plate covered with a PVC material.

14. The flexible reinforced wall of claim 11, wherein the hook part further comprises two hook elements.

15. The flexible reinforced wall of claim 14, wherein the two hook elements are oriented in opposing directions with one hook comprising a handle.

16. The flexible reinforced wall of claim 14, wherein the hook part further comprises one of a tube and ring for locking and fitting a seal thereto.

17. A flexible reinforced wall, comprising:
    a flexible canvas; and
    a trellis for reinforcing the canvas comprising a first plurality of ribbons arranged substantially parallel to one another and a second plurality of ribbons arranged substantially parallel to one another, said first plurality and said second plurality arranged in an overlapping relationship;

each ribbon of said first and said second plurality further comprising a metal core covered with a plastic material;

wherein the trellis is fixed to a surface of the canvas by one of glueing or welding.

18. The flexible reinforced wall of claim 17, wherein the plastic material comprises PVC and wherein the metal core comprises steel.

19. The flexible reinforced wall of claim 17, wherein the first plurality is arranged substantially perpendicular to the second plurality, and wherein the first plurality is spaced apart by a distance of approximately 10 cm and wherein the second plurality is spaced apart by a distance in the range of approximately 10 to 20 cm.

20. The flexible reinforced wall of claim 17, wherein the reinforced flexible wall further comprises a polygon shape with at least four sides; wherein a first side comprises a plurality of sliding devices, a second opposite side comprising a plurality of flexible attachment devices being regularly spaced, and third and fourth sides each comprising a longitudinal attachment device, each of the sliding devices, the flexible attachment devices, and the longitudinal attachment devices being fixable to a vehicle.

21. The flexible reinforced wall of claim 20, wherein each of the flexible attachment devices further comprise an elastic strap, said elastic strap including an anchoring bracket disposed on one end and a hook part on another end and wherein the anchoring bracket fixes the elastic strap to the second side and the hook part is engageable with a floor edge of the vehicle.

* * * * *